(12) United States Patent
Kley

(10) Patent No.: US 8,694,434 B1
(45) Date of Patent: Apr. 8, 2014

(54) TECHNIQUES FOR UNREGISTERING AND TRANSFERRING SOFTWARE LICENSES

(76) Inventor: Victor B. Kley, Berkeley, CA (US)

(*) Notice: Subject to any disclaimer, the term of this patent is extended or adjusted under 35 U.S.C. 154(b) by 1053 days.

(21) Appl. No.: 10/757,977

(22) Filed: Jan. 14, 2004

Related U.S. Application Data

(60) Provisional application No. 60/441,111, filed on Jan. 17, 2003.

(51) Int. Cl.
*G06Q 40/00* (2012.01)
*G06Q 20/12* (2012.01)

(52) U.S. Cl.
CPC ................................. *G06Q 20/1235* (2013.01)
USPC .......................................................... 705/59

(58) Field of Classification Search
USPC ........................................................... 705/59
See application file for complete search history.

(56) References Cited

U.S. PATENT DOCUMENTS

| | | | |
|---|---|---|---|
| 5,490,216 A * | 2/1996 | Richardson, III | 705/59 |
| 5,619,710 A * | 4/1997 | Travis et al. | 709/203 |
| 6,009,401 A * | 12/1999 | Horstmann | 705/317 |
| 6,948,166 B2 * | 9/2005 | Barfield et al. | 717/174 |
| 7,383,545 B1 * | 6/2008 | Yoo | 717/174 |
| 7,555,463 B2 * | 6/2009 | Schull | 705/51 |
| 2002/0049679 A1 * | 4/2002 | Russell et al. | 705/52 |
| 2002/0138441 A1 * | 9/2002 | Lopatic | 705/59 |
| 2002/0152393 A1 * | 10/2002 | Thoma et al. | 713/189 |
| 2003/0204723 A1 * | 10/2003 | Narin et al. | 713/165 |
| 2004/0143746 A1 * | 7/2004 | Ligeti et al. | 713/185 |
| 2007/0078978 A1 * | 4/2007 | Arnold et al. | 709/224 |

\* cited by examiner

*Primary Examiner* — Charles C Agwumezie
(74) *Attorney, Agent, or Firm* — Kilpatrick Townsend & Stockton LLP

(57) ABSTRACT

An automated way for a software customer to upgrade a hardware device and to recover his software license is provided. A software license can be automatically transferred from one hardware device to another hardware device. Software is unregistered from one hardware device by locking the software. When the user unregisters software from a hardware device, a passcode is transmitted to an unregister system. When the unregister system receives the passcode from the user, a license count is incremented. Software is registered on a new hardware device by generating a new unlock code. The unlock code is generated using the passcode and a fingerprint that identifies the new hardware device. The new hardware device receives the unlock code and attempts to match the fingerprint to unlock the software.

14 Claims, 3 Drawing Sheets

US 8,694,434 B1

TECHNIQUES FOR UNREGISTERING AND TRANSFERRING SOFTWARE LICENSES

CROSS-REFERENCES TO RELATED APPLICATIONS

This patent application claims the benefit of U.S. Provisional Application No. 60/441,111, filed Jan. 17, 2003, which is incorporated herein by reference.

BACKGROUND OF THE INVENTION

The present invention relates generally to techniques for unregistering and transferring software licensees, and in particular, to techniques for unregistering and transferring software licenses from one hardware device to another hardware device. For purposes of the present invention, software is understood to mean all programs, and data that can be licensed on the basis of individual devices, PDAs, telephones, computers or any device that can be used with licensable software or data elements.

Automatic licensing of a given identified computer or digital device (PDA, Cell Phone, Tablet) is now common with most systems. Automatic licenses can be used to control the use of software applications. An example of such an automated system is described in U.S. patent application Ser. No. 09/877,727, to Victor Kley, filed Jun. 8, 2001, entitled "Scalable Transaction System for a Network Environment," which is incorporated herein by reference.

Users frequently want to upgrade their computer hardware after a licensed copy of a software product has been stored on the hardware. For example, a customer can send out a digital device for repairs or replace it with a newer more powerful digital device. Recent reports have shown that many customers have problems maintaining and upgrading hardware without losing their licenses to software stored on the hardware. Software customers often lose their investment of resources and money into a licensed software product when old computer hardware is discarded or no longer used.

Therefore, it would be desirable to provide techniques that allow a user to easily unregister and transfer a license for software from one computer hardware device to another device.

BRIEF SUMMARY OF THE INVENTION

The present invention provides automated techniques that allow a software customer to upgrade a hardware device and to recover his license in a software program or software data stored on the hardware device. The present invention automatically transfers the license in a software program or data from one hardware device to another hardware device so that the software can be used legally on the new hardware device.

According to the present invention, software is unregistered from one hardware device by locking the software or placing it in a temporary demonstration (demo) state. When the user unregisters the software from a hardware device, a passcode is transmitted to an unregister system.

Software is registered on a new hardware device by generating a new unlock code. The unlock code is generated using the passcode and data that identifies the new hardware device. The new hardware device receives the unlock code and extracts the data. If the extracted data matches the fingerprint of the new hardware device, the software is unlocked on the new hardware device.

Some licensees want a less restrictive ability to make additional licensed use of the material to deal with unanticipated equipment failure or additional ancillary uses such as work, home, and portables, all with the same information and/or software. The present invention addresses these concerns by providing another embodiment. This embodiment uses licensor or licensee created registration based templates to provide an automated transaction system with a limited number of additional installations. As each additional installation is set up, the installer enters the original registration information and provides the identification which is checked online and added to the list of copies made by this particular user. If a licensor preset count limit is reached, the system refuses to authorize the additional identified installation.

In another embodiment, a licensee receives a unit (or count) limited license. Identifying information is recorded on a portable media provided by the supplier or sent to the licensee for use and possible recording on permanent media. A credit card or other valuable limiting reference is used to note the number of individual devices licensed and to affirm the identity of the licensee. Alternately, the count limit can cause a series of actions including purchase processes, sales presentations, contact, or directed communications.

Other objects, features, and advantages of the present invention will become apparent upon consideration of the following detailed description and the accompanying drawings, in which like reference designations represent like features throughout the figures.

DETAILED DESCRIPTION OF THE INVENTION

The present invention provides techniques for allowing a user to transfer a license for software from one hardware computer device to another hardware computer device. The present invention includes techniques for transferring licenses in software programs and software data between hardware devices. Hardware computer devices include personal computers, portable computing devices, personal digital assistants (PDAs), handheld devices, servers, multi-processor computers, computers that are part of a distributed computing system, and other types of computer devices.

Figure 1:
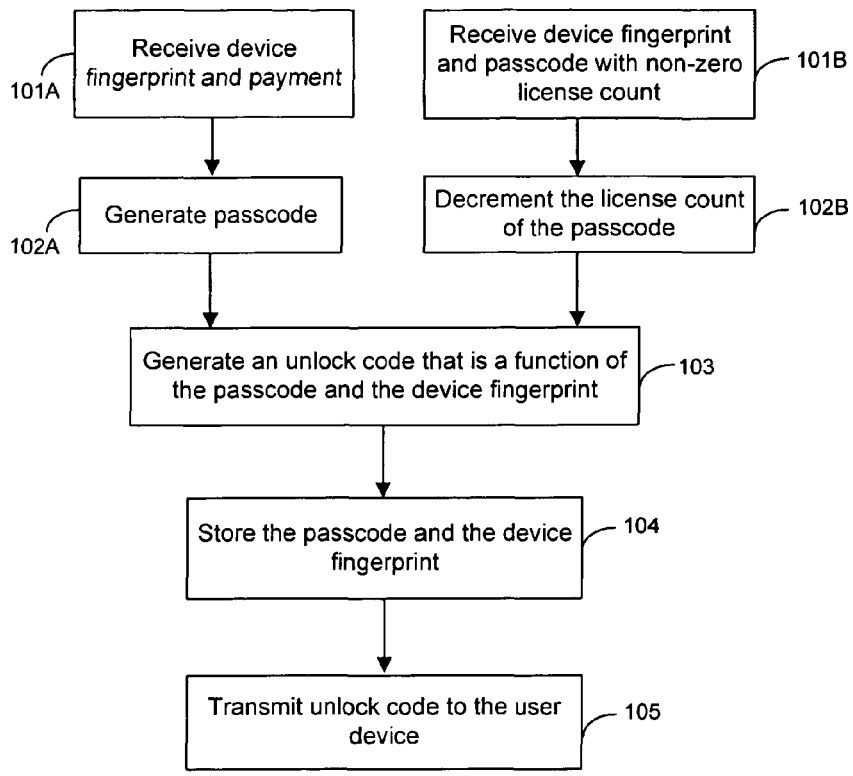
FIG. 1 is a flow chart that illustrates how an unregister system can generate an unlock code for unlocking software according to an embodiment of the present invention.

FIG. 1 is a flow chart that illustrates how a software product can be registered on a hardware device according to an embodiment of the present invention. Initially, a user can install a demonstration version of a software product on hardware device. The user can then communicate with an unregister system to unlock and fully enable the software product.

In order to unlock the software product, the user contacts the unregister system and provides device-specific data unique to the device. For example, the device-specific data can be a device fingerprint that is unique to a particular device.

In one embodiment, a local software module queries the user's device for its unique device fingerprint or product identification code, such as a unique processor identification code. The software module can also use properties of the device (such as active ports, microprocessor type number, time stamp etc.) to create a unique number. The device fingerprint, identification (ID) code, or created number is then sent to the unregister system via any existing communications path. The fingerprint, ID, or created number can be encrypted before it is sent to the unregister system.

To simplify the discussion, the present invention is discussed herein primarily in the context of a device fingerprint. It should be understood that many other types of device-specific data can be used in conjunction with the techniques of the present invention.

A user can receive a license to operate a software product by providing payment and the device fingerprint or other device-specific information to the unregister system. Payment can be provided by credit card, account debit, or any other suitable means. At step 101A, the unregister system receives payment and the device fingerprint. At step 102A, the unregister system generates a unique passcode (e.g., a token symbol). The passcode can be generated using, for example, any well-known random number generation technique.

The passcode has a license count associated with it. The license count indicates how many available software licenses the passcode has left to unlock a software product. The license count can be set to any value. For example, if the license is set at zero, then the passcode has no remaining software licenses available to it.

Alternatively, a user can receive a software license by providing device specific data (e.g., a device fingerprint) and a passcode with a non-zero license count to the unregister system. The non-zero license count indicates that the user has at least one credit available to receive a license to operate a particular software product. At step 101B, the unregister system receives a device fingerprint (or other device specific data) and a passcode with a non-zero license count from a user. At step 102B, the license count of the passcode is decremented by one (or more if the user wants more than one license). After the license count is decreased by one, the passcode has one less software license available to unlock the software.

Upon receiving payment (or a passcode having a non-zero license count), a new "unlock" code is generated at step 103. The unlock code is a function of the passcode and the device fingerprint (or other device specific data). The unlock code can be generated, for example, by using any well-known encryption or hashing algorithm such as the Digital Signature Algorithm or the RSA algorithm.

At step 104, the unregister system stores the passcode and the device fingerprint for future use. According to specific embodiments of the present invention, the unregister system can store a date of the transaction, customer information including address and contact information, and other matters as the application may demand. At step 105, the unlock code (optionally in encrypted form) is communicated to the user's hardware device.

Figure 2:
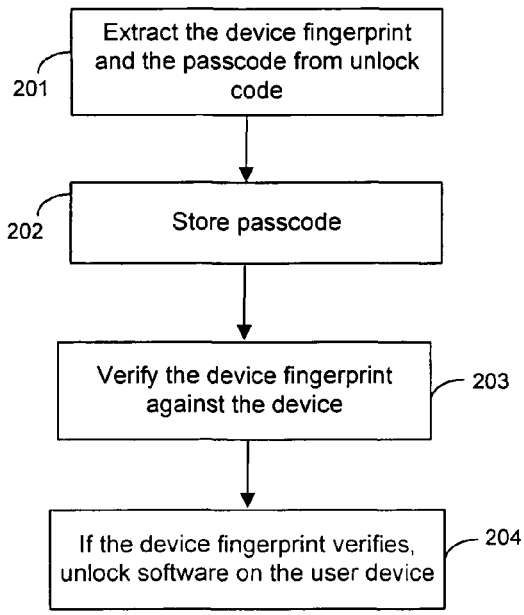
FIG. 2 is a flow chart that illustrates how a user's hardware device can use an unlock code to unlock software for use on the hardware device according to an embodiment of the present invention.

FIG. 2 illustrates how a user's hardware device can use an unlock code to unlock software for use on the hardware device according to an embodiment of the present invention. Upon receiving the unlock code from the unregister system, software on the user's hardware device, extracts the device fingerprint and the passcode from the unlock code at step 201. The passcode is then stored on the user's device securely at step 202.

The device fingerprint extracted from the unlock code is then compared to the device fingerprint that identifies the user's device at step 203. If the extracted device fingerprint matches, the device fingerprint is verified, and the software is unlocked on the user's hardware device at step 204. After the software product is unlocked, it is fully operational and no longer in demo mode. The process described with respect to FIGS. 1 and 2 allow a user to obtain a valid license for software in a secure manner.

The unlock code will not work on any other device. The passcode may or may not be known to the user, but it is retained for reuse when unregister is performed. For example, the passcode may be encrypted so that the user stores it in encrypted form without seeing it and re-offers it for enabling a new or repaired device again without the user actually knowing the code. However, in a preferred embodiment, the passcode is visible and recordable by the user in the clear.

Figure 3:
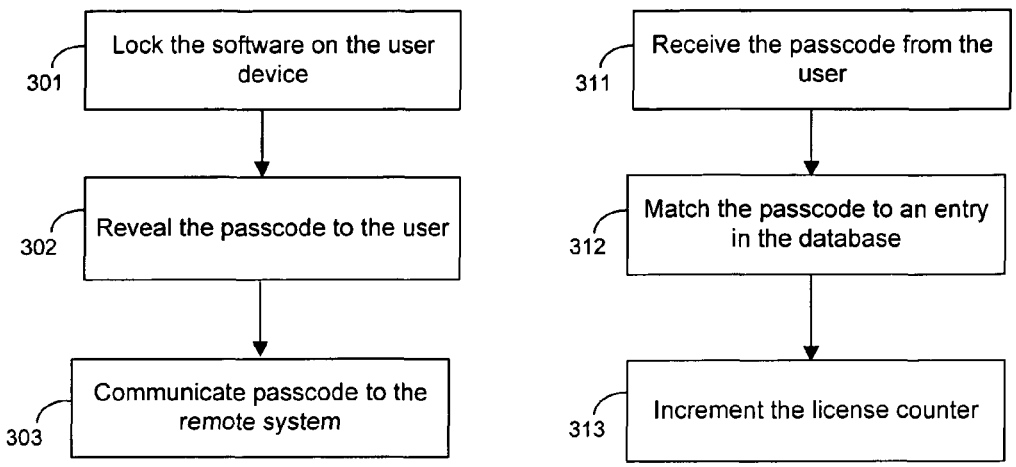
FIG. 3 shows two flow charts that illustrate how software can be locked on a hardware device so that its software license can be transferred to another device according to an embodiment of the present invention.
Figure 4:
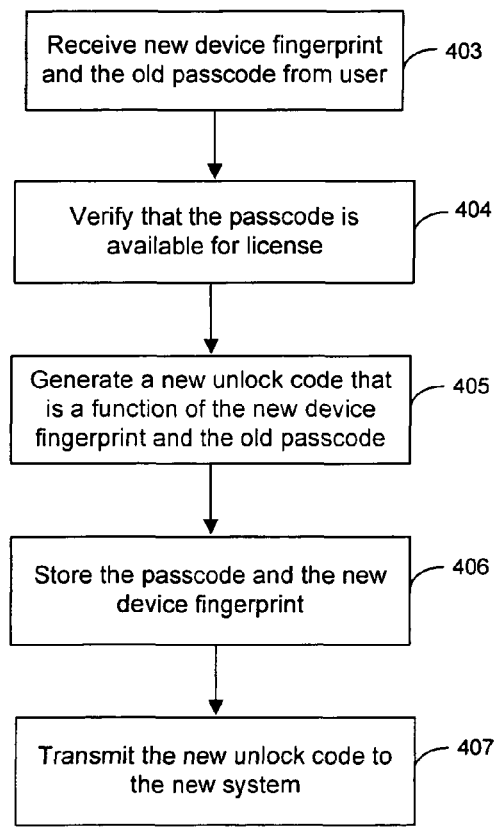
FIG. 4 is a flow chart that illustrates how an unregister system can generate a new unlock code for a new hardware device according to an embodiment of the present invention.

FIGS. 3 and 4 illustrate how a user can unregister software in order to transfer a license for the software to another hardware device. FIG. 3 is discussed first. To transfer the license to software from a first device to a second device, the software on the first device locks itself at step 301. The software can lock itself, for example, by deleting the software code entirely from the user device or by returning the software application to a demonstration mode that may be a timed demo or a feature-limited demo.

Locking the software by returning the software to a demonstration mode further enhances the convenience of moving from one device to another. A courtesy demonstration period can provide a user the opportunity to take key information, programs and/or data from the first (old) hardware device to the second (new) registered device. Thus, in a specific embodiment, the present invention permits an issued license to be reused and the software to be restored to an unlicensed and/or demonstration state automatically and without major expense in reacquiring the license.

Flags are set in the user's device to signal that the license is removed when the unregister system has freed the specific license, symbol or passcode for use. In the case of a single passcode used for multiple device licenses, the available license counts are incremented by one or more units that correspond to the number of licenses associated with the given unregistration process.

The software reveals the passcode to the user at step 302. For example, the passcode can be displayed to the user in a dialog box on a display screen. The user can then communicate the passcode to the unregister system at step 303, either actively or by use of communications links available in or associated with the user's device.

The unregister system receives the passcode from the user at step 311. The passcode is then matched with an entry in a database at step 312. The database stores the passcodes that have been generated for new software licenses (step 102A). If the passcode received from the user matches an entry in the database, the license count associated with the passcode is incremented at step 313. Incrementing the license count allows a new unlock code to be issued to a new device at a future time. Alternatively, the unregister system can provide another type of data that allows the user to register another device at a future time.

The register and unregister processes can be unitary operations for a given computer system regardless of how many licenses are on a given passcode. According to further embodiment of the present invention, a system with N devices and a master device(s) can bulk unlock N devices and unregister M devices. M is less than N, and M and N are integers.

FIG. 4 illustrates how a new unlock code can be generated for a new hardware device according to an embodiment of the present invention. After the user receives a new or repaired hardware device, the user transmits the old passcode and a device fingerprint (or other device-specific information identifying the new hardware device) to the unregister system. The unregister system receives the old passcode and the new device fingerprint or device-specific information from the user at step 403.

After receiving the old passcode, the unregister system verifies that the old passcode is available for an additional software license at step 404. The unregister system looks at the value of the license count to determine if the passcode has additional software licenses available. If the license count is greater than zero, the passcode has at least one software license available. The unregister system also matches the passcode to an entry in the database to determine whether the passcode was previously registered. If the passcode was previously unregistered, at least one new software license is available to the passcode.

A new unlock code is then generated at step 405. The new unlock code is a function of the old passcode and the new device fingerprint (or other device-specific information). The unlock process decreases the license count by the credit of the passcode. For example, if the unlock code is generated to install 3 copies of the software, the license count for that passcode is decremented by 3. A passcode with no credit is a dead passcode and cannot be used to generate another unlock code.

The unregister system then stores the passcode and the new device fingerprint at step 406. The new unlock code is transmitted to the second (new) hardware device at step 407. The user can then unlock the software on the new hardware device using the new unlock code as discussed above with respect to FIG. 2.

In the flow charts of FIGS. 1-4, the data transfers can be made via the Internet to net-based automated systems. Alternatively, state changes can be transferred through another medium to the automated system from which a reply and completion of the unregistration process is made through that medium. Many other communication means and methods including local area networks, computer buses, dedicated serial lines etc., are well known to those in the art and may be freely substituted and used with the present invention.

In an alternative embodiment, the processes are set in motion automatically by removal of a component or access cover on the user's device. The license information is removed from the user's device, component, or components (under access cover) and stored electronically on or accessible to the user's device. When the same or similar components are reattached to this or some other device, the license is automatically restored for use.

Figure 5:
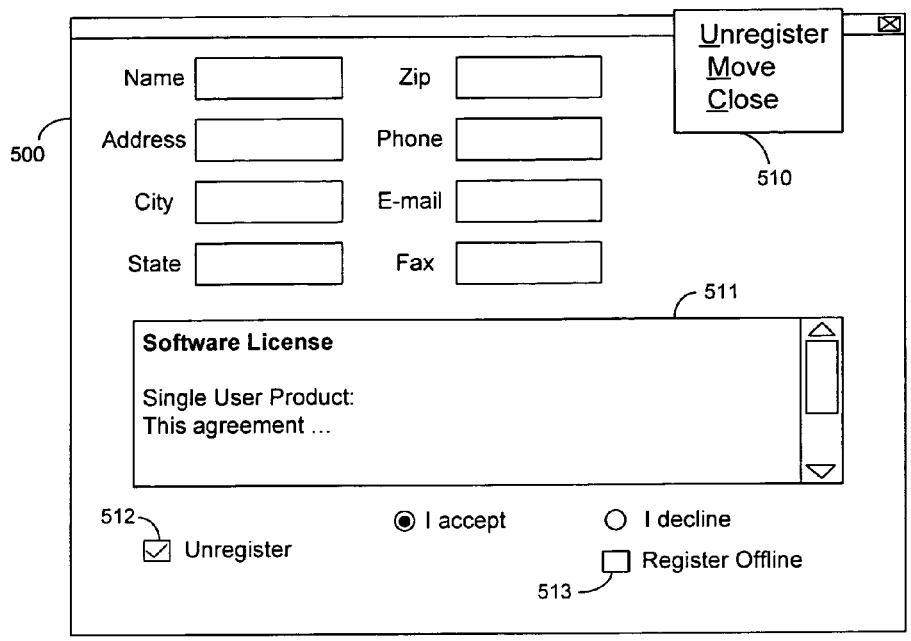
FIG. 5 illustrates an example of a user interface that can be used to unregister software before it is transferred to another hardware device according to an embodiment of the present invention.

The unregister process of the present invention is only available for unlocked programs. FIG. 5 illustrates an interface 500 that a user's device can provide to allow the user to unregister a software product. The user can launch the unregister process by checking the unregister check box 512. The user can also launch the unregister process by selecting menu 510 item 'Unregister' as shown in FIG. 5.

Interface 500 allows a user to enter his name, address and other information in various fields. Interface 500 also requires that the user accept a software license agreement displayed in region 511 before a software product is unregistered. A user can register a product offline by checking check box 513. A message box can be displayed to inform the user when the unregister process has been completed.

Figure 6:
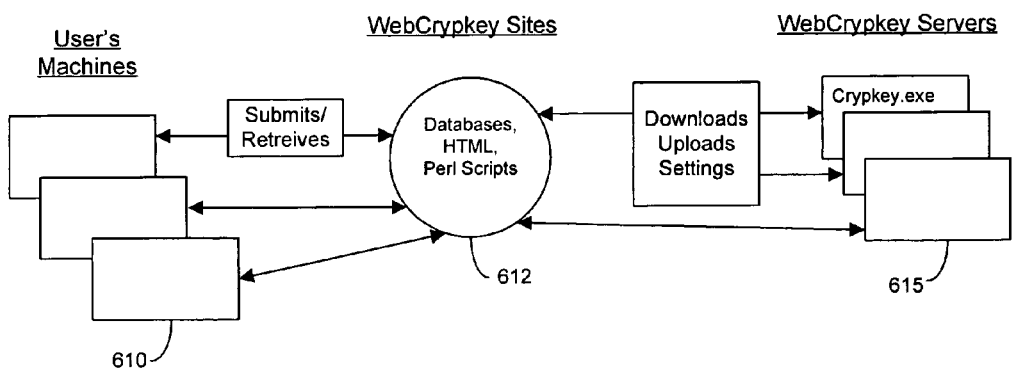
FIG. 6 illustrates an example of a distributed system that can implement embodiments of the present invention.

FIG. 6 illustrates an architecture diagram of a distributed system that implements embodiments of the present invention. User machines/devices 610 can communicate with WebCrypkey web sites 612 through the Internet or by other means. WebCrypkey represents one embodiment of an unregister system that can implement software unregister features of the present invention. The WebCrypkey sites link to databases, HTML code, and perl scripts among other features. The WebCrypKey sites can download and upload data and settings from WebCrypkey servers 615.

Some licensees want a less restrictive ability to make additional licensed use of software to deal with unanticipated equipment failure or additional ancillary uses such as work, home, and portables, all with the same information and/or software. The present invention addresses these concerns by providing another embodiment. This embodiment uses licensor or licensee created registration based templates to provide an automated transaction system and a limited number of additional installations.

According to this embodiment of the present invention, a licensee obtains an upper-limited, less restrictive right to create additional installations of software. In operation, the typical user first fills out the registration information and then selects a purchase option providing the right to multiple installations. These additional installations cannot be unregistered and do not require encrypted codes or keys. This permits the installation to proceed more quickly and at a potentially significant reduction in overhead and cost to the user.

The primary or initial installation made during registration includes a reliable and confirmable means of identification such as the user's credit card information. One or more of these means are used to create the encrypted data set for ongoing multiple installations. The primary installation may or may not have the ability to be unregistered and may or may not have an encrypted code uniquely defined by the computer in which it is installed.

As each additional installation is set up the installer enters the original registration information and provides an identification such as a passcode or device fingerprint. The identification is checked online and added to the list of copies made by this particular user. If a licensor preset count limit is reached, the system refuses to authorize the additional identified installation. The installation is also rejected if the identification is not current or valid. Alternately, the count limit may also cause a series of actions including purchase processes, sales presentations, contact, or directed communications.

In another embodiment of the present invention that acts as an adjunct and compliment to the embodiments described above, a unit (count) limited software license can be provided to a licensee (user). In this embodiment, identifying information is recorded on some portable media (e.g., compact disc or floppy disk) provided by the supplier and sent to the licensee for use and possible recording on permanent media (e.g., the user's device). The licensee can install the software from the portable media using the registration information stored thereon and credit card information. No passcode is created on the user's device in this embodiment to save time and transaction fees. A transaction is made to confirm the user's credit card. An unlock key is transmitted to the user's device. The unlock key transmission and credit card confirmation steps can be performed offline. The credit card (or other valuable limiting reference) is used to record the number of individual machines licensed and to affirm the identity of the licensee. The latter number can be used to limit (refuse additional such licenses) and/or the count limit can cause a series of actions including purchase processes, sales presentations, contact, or directed communications.

Software code that can implement the unregister system of the present invention is accompanied with the present application on CD-ROM.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A method for transferring a license for software between hardware devices, the software having an unregistered state and a registered state, wherein the software is in the unregistered state when the software is initially installed on a user device, wherein the software is in the registered state after the software receives information based on a passcode, the method including a step of unregistering comprising:
    at a first user device, receiving input from a user to initiate an action to unregister software stored on the first user device, the software being in the registered state;
    in response, placing the software stored on the first user device in the unregistered state, wherein the software remains installed but can only operate in a demonstration mode on the first user device and is no longer licensed for use on the first user device, and providing a passcode to the user of the software, the passcode having been previously used to register the software;
    wherein the passcode, if communicated to a server computer having a license count associated with the passcode stored on the server computer, causes the license count to be incremented so as to allow the server computer to issue a new passcode for the software at a later time.

2. A non-transitory computer readable storage medium encoded with computer-executable computer instructions that when executed cause the computer to effect transfer of a license for software between hardware devices, the software having an unregistered state and a registered state, wherein the software is in the unregistered state when the software is initially installed on a user device, wherein the software is in the registered state after the software receives information based on a passcode, wherein a portion of the computer-executable computer instructions, when executed, causes the computer to perform a step of unregistering the software comprising:
    receiving from a first user device an indication to unregister software stored on the first user device, the software being in a registered state; and
    placing the software stored on the first user device in an unregistered state in response to receiving the indication to unregister, wherein the software remains installed but can only operate in a demonstration mode on the first user device and is no longer licensed for use on the first user device, including providing a passcode to a user of the software on the first user device, the passcode having been previously used to license the software;
    wherein the passcode, if communicated to a server computer having a license count associated with the passcode stored on the server computer, causes the license count to be incremented so as to allow the server computer to issue a new passcode for the software at a later time.

3. The method according to claim 1 wherein unregistering the software comprises providing the passcode from a database to the user.

4. The method according to claim 1 further comprising:
    receiving first data identifying a second user device and the passcode;
    verifying that the passcode is available for a license;
    generating an unlock code using the first data and the passcode; and
    transmitting the unlock code to the second user device, wherein the unlock code allows the second user device to license the software on the second user device.

5. The method according to claim 4 wherein the passcode contains an upper-limited number of licenses to create additional installations of the software.

6. The method according to claim 4 further comprising:
    receiving the passcode;
    extracting the unlock code and the first data;
    storing the unlock code in encrypted form;
    verifying that the first data identifies the second user device; and
    if the first data verifies, unlocking the software on the second user device so that the software on the second user device is licensed for use by the user.

7. The method according to claim 6 wherein registering the software on the second user device includes decrementing the license count associated with the passcode.

8. The method according to claim 4 wherein the first data is a device fingerprint identifying the second user device.

9. The method according to claim 1 wherein the demonstration mode on the first user device is a timed demonstration mode.

10. The method of claim 1 wherein providing a passcode to the user of the software comprises visually displaying the passcode on a display device.

11. The non-transitory computer readable storage medium according to claim 2 further encoded with computer-executable computer instructions that when executed cause the computer to perform the step of locking the software on the first user device.

12. The non-transitory computer readable storage medium according to claim 11 further encoded with computer-executable computer instructions that when executed cause the computer to perform the step of providing the passcode from a database to the user responsive to receiving the indication to unregister.

13. The non-transitory computer readable storage medium according to claim 11 further encoded with computer-executable computer instructions that when executed cause the computer to perform the steps of
    receiving first data identifying a second user device and the passcode;
    verifying that the passcode is available for a license;
    generating an unlock code using the first data and the passcode; and
    transmitting the unlock code to the second user device, wherein the unlock code allows the second user device to license the software on the second user device.

14. The non-transitory computer readable storage medium according to claim 2 wherein providing a passcode to the user of the software comprises visually displaying the passcode on a display device.

\* \* \* \* \*